(12) United States Patent
Dutheil

(10) Patent No.: US 10,316,796 B2
(45) Date of Patent: Jun. 11, 2019

(54) COMBUSTION GAS DISCHARGE NOZZLE FOR A ROCKET ENGINE PROVIDED WITH A SEALING DEVICE BETWEEN A STATIONARY PART AND A MOVING PART OF THE NOZZLE

(71) Applicant: AIRBUS DEFENCE & SPACE SAS, Les Mureaux (FR)

(72) Inventor: Jean-Philippe Dutheil, Martignas-sur-Jalles (FR)

(73) Assignee: AIRBUS SAFRAN LAUNCHERS SAS, Paris (FR)

( * ) Notice: Subject to any disclaimer, the term of this patent is extended or adjusted under 35 U.S.C. 154(b) by 768 days.

(21) Appl. No.: 14/905,923

(22) PCT Filed: Jul. 23, 2014

(86) PCT No.: PCT/EP2014/065838
§ 371 (c)(1),
(2) Date: Jan. 18, 2016

(87) PCT Pub. No.: WO2015/011198
PCT Pub. Date: Jan. 29, 2015

(65) Prior Publication Data
US 2016/0177875 A1 Jun. 23, 2016

(30) Foreign Application Priority Data
Jul. 26, 2013 (FR) ...................................... 13 57381

(51) Int. Cl.
*F02K 9/86* (2006.01)
*F02K 1/80* (2006.01)
(Continued)

(52) U.S. Cl.
CPC ................ *F02K 9/86* (2013.01); *F02K 1/805* (2013.01); *F02K 9/90* (2013.01); *F02K 9/97* (2013.01);
(Continued)

(58) Field of Classification Search
CPC ... F02K 1/805; F02K 9/48; F02K 9/86; F02K 9/90; F02K 9/972; F02K 9/978; F05D 2240/55
See application file for complete search history.

(56) References Cited

U.S. PATENT DOCUMENTS 3,093,963 A * 6/1963 York, Jr. .................. F02K 9/48
60/228
3,159,524 A 12/1964 Cantabene et al.
(Continued)

FOREIGN PATENT DOCUMENTS

EP 1482127 12/2004
EP 1959124 8/2008
(Continued)

OTHER PUBLICATIONS

International Search Report, International Application No. PCT/EP2014/065838, dated Oct. 1, 2014.

*Primary Examiner* — Lorne E Meade
(74) *Attorney, Agent, or Firm* — Gottlieb, Rackman & Reisman, PC

(57) ABSTRACT

The invention relates to a combustion gas discharge nozzle for a rocket engine including a stationary part and a moving part extending from the stationary part, the moving part made using flaps positioned downstream from the stationary part and forming an extension of the nozzle, the nozzle including a sealing device extending between the fixed part and the moving part in the form of a flexible membrane withstanding a local temperature of the combustion gases at the nozzle outlet and connecting the end of the stationary (Continued)

part to a border of the flaps or petals forming the moving part, the flexible membrane forming an annular tubing, the sealing device being provided with a duct for injecting gas at the flexible membrane between the stationary part and the moving part extending the nozzle.

13 Claims, 2 Drawing Sheets

(51) Int. Cl.
    *F02K 9/90*     (2006.01)
    *F02K 9/97*     (2006.01)

(52) U.S. Cl.
    CPC .......... *F02K 9/978* (2013.01); *F05D 2220/80* (2013.01); *F05D 2240/128* (2013.01); *F05D 2240/55* (2013.01)

(56) References Cited

U.S. PATENT DOCUMENTS

| | | | | |
|---|---|---|---|---|
| 3,229,457 | A | * | 1/1966 | Rowe ...................... F02K 9/976 239/127.3 |
| 3,231,197 | A | * | 1/1966 | Strom ...................... F02K 1/10 138/111 |
| 3,249,306 | A | * | 5/1966 | Altseimer ............... F02K 9/976 239/127.1 |
| 3,358,932 | A | | 12/1967 | Wilhite |
| 3,596,465 | A | * | 8/1971 | Paine ...................... F02K 9/976 139/425 R |
| 4,947,644 | A | * | 8/1990 | Hermant .................. F02K 1/30 239/265.17 |
| 5,481,870 | A | * | 1/1996 | Pacou ..................... F02K 9/978 239/265.15 |
| 6,723,972 | B2 | * | 4/2004 | Schroeder ............... F02K 1/008 244/3.24 |
| 6,966,189 | B2 | | 11/2005 | Lapergue et al. |
| 8,604,402 | B2 | | 12/2013 | Prampolini |

FOREIGN PATENT DOCUMENTS

| | | |
|---|---|---|
| EP | 2222565 | 9/2010 |
| FR | 2924411 | 6/2009 |

\* cited by examiner

COMBUSTION GAS DISCHARGE NOZZLE FOR A ROCKET ENGINE PROVIDED WITH A SEALING DEVICE BETWEEN A STATIONARY PART AND A MOVING PART OF THE NOZZLE

CROSS REFERENCE TO RELATED APPLICATIONS

This application is the National Stage of International Application No. PCT/EP2014/065838, having an International Filing Date of 23 Jul. 2014, which designated the United States of America, and which International Application was published under PCT Article 21(2) as WO Publication No. 2015/011198 A1, and which claims priority from, and the benefit of French Application No. 1357381, filed 26 Jul. 2013, the disclosures of which are incorporated herein by reference in their entireties.

BACKGROUND

1. Field

The presently disclosed embodiment relates to a nozzle for ejecting combustion gas of a rocket engine, which nozzle is provided with a sealing device between a fixed part and a moving part of the nozzle. The disclosed embodiment is particularly applicable to a rocket engine of a space vehicle such as a spaceplane in particular. The moving part is more particularly produced in the form of orientable flaps of the nozzle. This device, according to one aspect of the disclosed embodiment, is combined with a nozzle divergent cooling device.

2. Brief Description of Related Developments

The presently disclosed embodiment is based on, and an improvement of, a device with orientable flaps as described in document EP 2 222 565 A1 (and U.S. Pat. No. 8,604,402).

Known adaptive nozzles on turbine engines are not used on rocket engines because, notably in the case of space applications of rocket engines, since the external environment is at a pressure lower than the pressure of the hot gases, if the connection is not fluidtight, the latter gases will flow through this connection to outside the nozzle. This flow will create disturbing forces, reducing the performance by reducing the axial flow rate elected and may potentially, through thermal flux or fire, destroy the mechanism that actuates the petals or flaps of the moving part of the nozzle and/or the rear structure of the vehicle. One essential aspect that has to be mastered is therefore the creation of a seal at the connection between the moving part and the fixed part of the nozzle with respect to the hot gases expanded inside the nozzle.

SUMMARY

It is an object of the disclosed embodiment to propose a solution to this need for sealing at the section at which the moving part of the nozzle is situated and in order to achieve this the disclosed embodiment proposes a nozzle for ejecting combustion gas from a rocket engine comprising a fixed part and a moving part, extending the fixed part, said moving part, produced in the form of flaps, being positioned downstream of the fixed part and forming an extension of the nozzle, the nozzle comprising a sealing device providing sealing between the fixed part and the moving part in the form of a flexible membrane resistant to a temperature at the exit of the nozzle and connecting the end of the fixed part to a border of the flaps or petals that form the moving part, the flexible membrane forming an annular pipe, the sealing device being provided with means for injecting the gas at the flexible membrane between the fixed part and the moving part extending said nozzle.

This aspect has the particular advantage firstly of allowing the creation of moving flaps while at the same time avoiding losses of jet between the fixed part of the nozzle and the moving parts and secondly of limiting the temperature to which the flaps and the sealing membrane are subjected.

In this case, the annular pipe is preferably configured to distribute the gas over the perimeter of the outlet section of the fixed part of the nozzle.

The annular pipe is advantageously situated in line with an articulation of the moving part.

The flexible membrane is a silica-based fabric able to withstand continuously a temperature of at least 1000° C.

According to one particular aspect, the barrier comprises a ceramic insulator between two fabrics, one of them consisting of a fabric made from an aluminoborosilicate refractory ceramic fiber on the hot face, the other of aramid fiber type such as poly-paraphenylene terephthalamide on the cold face, the latter fabric being intended to give the product mechanical integrity.

The disclosed embodiment further relates to a rocket engine comprising a nozzle with a fixed part, moving part and sealing device as defined hereinabove, for which the flaps are arranged around the exit section of the rocket motor nozzle as an extension of the fixed part.

The flexible membrane advantageously forms an annular pipe for injecting the exhaust gas of a turbine of a turbopump of the rocket engine between the fixed part of the nozzle and the moving part extending said nozzle, the pressure of the exhaust gases being regulated so as to be higher than the pressure of the gases leaving the fixed part of the nozzle.

According to one particular aspect, the flaps are articulated on a frame of the vehicle.

The frame advantageously forms part of the rear fuselage in which the rocket engine is installed.

The flaps are preferably able to move and able to allow the moving part to adopt:

a closed cone shape, so as to provide an aerodynamic external shape that minimizes the drag of the base of the vehicle during atmospheric flight with the rocket engine not lit;

a cylinder shape (B) at the moment of ignition of the rocket engine;

a conical divergent shape (C) in the extension and continuation of the exit section of the rocket engine divergent so as to encourage the expansion of the rocket engine jet.

The openness of the cone may be variable according to the increase in altitude during rocket propelled flight.

The aircraft advantageously comprises a mechanism for pivoting the flaps which is able to allow differential openings or closings of said flaps which deflect the jet of the rocket engine and thus create a lateral thrust component that allows the vehicle to be steered about the axes of pitch and yaw.

The flaps are preferably arranged in two rows with the internal/external surfaces of adjacent flaps overlapping one another and are suited to allowing a variation in the exit section of the nozzle while at the same time maintaining an overlap that minimizes leaks of ejected combustion gas.

BRIEF DESCRIPTION OF THE DRAWINGS

Further features and advantages of the disclosed embodiment will become apparent from reading the following description of one nonlimiting exemplary aspect of the disclosed embodiment, given with reference to the drawings which depict.

DETAILED DESCRIPTION

The presently disclosed embodiment relates first and foremost to a system of flaps arranged in the form of petals around the exit section of a nozzle of the rocket engine, and which is mounted on a frame of the vehicle belonging to the rear fuselage in which the rocket engine is installed.

In the presently disclosed embodiment, the flaps and the divergent are designed in the traditional way according to the temperature and mechanical loadings they have to withstand. They may be made of metallic or ceramic materials, be refractory or be cooled for example by an internal circulation of cold propellants.

The disclosed embodiment applies in particular to a rocket engine operating on a gas generator cycle.

The system articulating the moving flaps or petals of the rocket engine nozzle is, in this instance, based on a setup involving hinges, electromechanical actuators and link rods which allow the flaps to be angled so as to close or open the nozzle in the moving part thereof.

Figure 1:
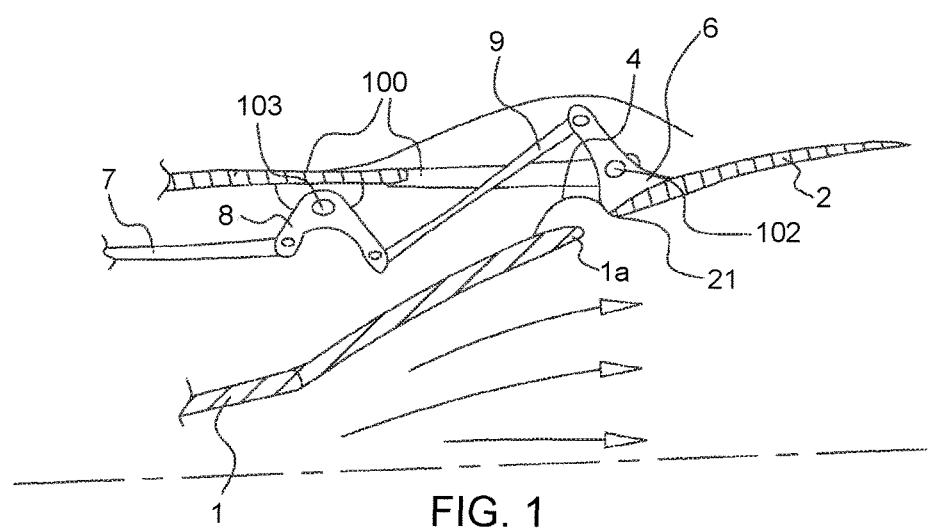
FIG. 1 is a schematic view in section of a nozzle according to a first aspect of the disclosed embodiment.

FIG. 1 depicts in section one of the flaps 2 articulated by an operating device, here produced in the form of link rods 7, 9, levers and rocker arms 6, 8 which transmit commands, originating for example from actuating cylinders 110, intended to orient the flaps. The flaps are connected to a frame 100 on which pivot points 102, 103 are created so as to allow the rotational movements of the flaps and co-ordinate the elements of the operating device.

The device activated by the actuating cylinders 110 is connected to the controls of the craft or to the navigation computer which controls the actuating cylinders according to the phase of flight.

The device is designed to move each flap independently or to control them altogether.

The flap 2 is positioned in the extension of the fixed part 1 of a rocket engine nozzle.

Figure 3:
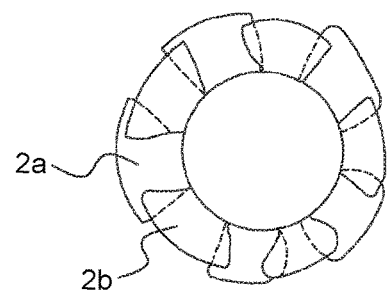
FIG. 3 is a rear view of a particular arrangement of flaps of the disclosed embodiment.

The shape of the moving flaps and the dynamics thereof are determined so as to obtain an overlapping of the internal/external surfaces of adjacent moving elements so as to allow a variation in the exit section of the nozzle while at the same time minimizing leaks of ejected combustion gas. According to FIG. 3, the flaps are, for this reason, positioned in two rows in which the flaps 2b of a first row have their lateral ends partially overlapped by the flaps 2a of a second row. The degree of overlap compared with the surface area of the flaps is determined in order to minimize as far as possible, or even completely eliminate, leaks between the gaps between flaps over the entire range of movement of these flaps in the manner of a system similar to an iris while maintaining a number of flaps that is reasonable in relation to the complexity of the controls and the mass of control devices carried.

Returning to FIG. 1, sealing means are positioned between the fixed part 1 of the nozzle and the moving part 2. These sealing means are produced in the form of a flexible membrane 4 in the form of an annular pipe connecting the distal end 1a of the fixed part 1 and the edge 21, adjacent to this end, of the flaps 2, 2a, 2b that embody the moving part.

This is a flexible membrane, extending around the perimeter of the junction between the fixed part and the moving part, fixed loosely to these parts and which, because of its curved or bellow shape, adapts to the movement of the flaps.

The flexible membrane is of the flexible heat shield type, produced using ceramic products, some of them being capable of continuously withstanding temperatures in excess of 1000° C. or even 1300° C., the shield comprising for example a ceramic insulator between two fabrics, one of them such as a material consisting of an aluminoborosilicate refractory ceramic fiber fabric (known by the 3M company tradename of Nextel 440), coated with an organic finishing layer on the hot face, and the other of the aramid fiber type such as poly-paraphenylene terephthalamide known by the tradename Kevlar on the cold face, the latter fabric being intended to give the product mechanical integrity.

The membrane is fixed to the divergent and to the flaps for example mechanically using known techniques notably given that the temperature there is relatively low, between 600 and 1000° C. at most.

Use will be made for example of a fixing using fixing holes of the slot type at the border of the flexible membrane, pegs on the cold faces of the divergents, these pegs being fitted by welding or brazing for example, which is likewise a known process, whether used on ceramic or on metal.

The pegs, which are threaded at their free end, are passed through the slots in the flexible membrane.

Nuts screwed onto the pegs clamp the flexible membrane.

A strip that is pierced to accommodate the pegs is possibly added between the nuts and the membrane in order to provide a better seal between membrane and divergent.

A space is left between the distal end of the fixed part and the adjacent edge of the flaps rather than having the edges butting together.

This space forms a gap between the fixed part and the moving part, which gap can vary as the orientation of the flaps changes, thereby simplifying flap control.

This gap between the flaps and the divergent measures a few millimeters, for example 1 to 4 mm, and needs to be as small as possible while at the same time accounting for clearances, differential expansions or other constraints present in this part of the divergent.

To this end, the sealing device formed by the membrane between the fixed part of the nozzle and the moving part is situated in line with the articulation of the moving part and compensates for the variations in distance between the fixed part and the moving part.

Figure 2:
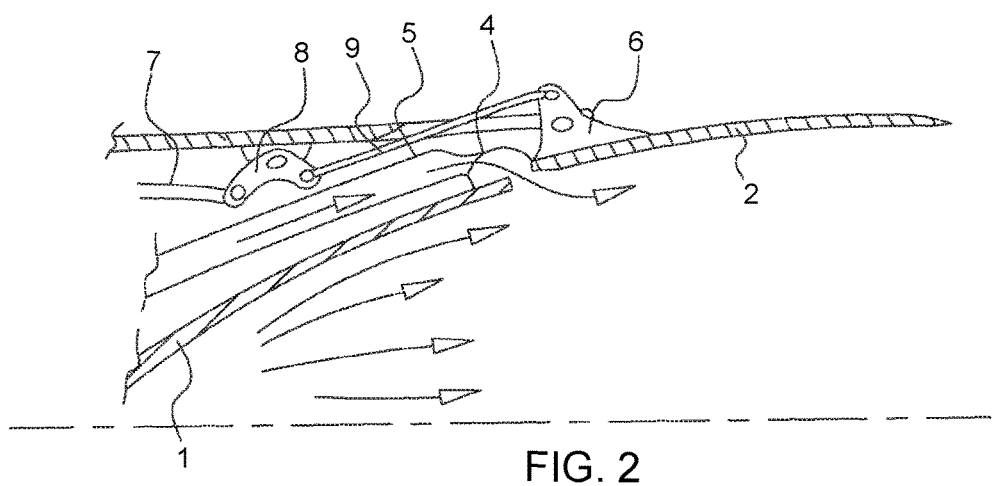
FIG. 2 is a schematic view in section of a nozzle according to a second aspect of the disclosed embodiment.
Figure 4:
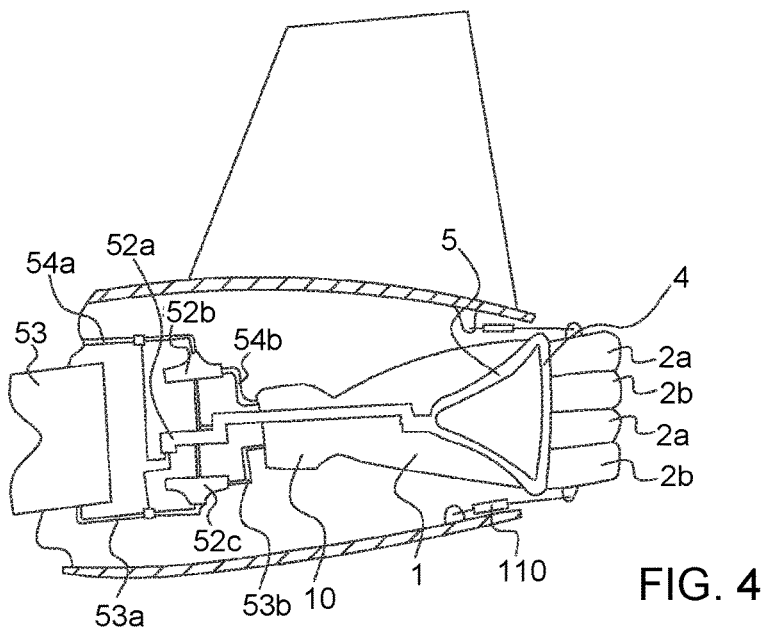
FIG. 4 is a schematic view in section of the rear of an aircraft equipped with a rocket engine equipped with flaps according to the disclosed embodiment with the nozzle in the open position.

According to FIG. 2, the membrane accommodates ducts 5 conveying exhaust gas from a turbopump, as depicted in FIG. 4.

The turbopump according to the example comprises a turbine 52a and pumps 52b, 52c which supply the rocket engine 10 with oxidant from a reservoir 53 through pipes 53a, 53b and with fuel from a reservoir, not depicted, through pipes 54a, 54b.

According to the example, the sealing device made up of the flexible membrane 4 forms an annular pipe for injecting the exhaust gases from the turbine of the turbopump between the fixed part 1 and the moving part 2.

The annular pipe distributes the flow of turbine exhaust gases carried by the ducts 5 to the perimeter of the exit section of the fixed nozzle.

These gases will spread out in the pipe created by the flexible membrane 4 in order to be distributed uniformally between the moving part 2 and the fixed part 1 and are therefore introduced between the fixed part and the moving part inside the nozzle with a radial distribution.

The flexible membrane 4 which connects the external lip of the fixed part 1 to each border of the moving flaps 2 is made for example from a silica-based and/or ceramic-based fabric able to withstand very high temperatures, typically a fabric able to withstand continuously a temperature of 1000° C., the fabric being, for example, at least 1 mm thick.

The effect it has is to seal the fixed part of the nozzle with respect to the moving part and conduct the turbine exhaust gases which are at approximately 700° C./800° C. towards the stream of propulsion gas inside the nozzle. Without this cooling, the gases arriving at the gap between the divergent/flaps would be at around 1500° C. and this would cause problems with the operation of the flaps and the long-term integrity thereof.

The pressure of the exhaust gases is regulated so that it is higher than the pressure of the gases of the nozzle which have already been greatly expanded in this section where their pressure is around 200 mbar. An exhaust gas pressure typically of 1 bar makes it possible for example to oppose the nozzle gases. The exhaust gas pressure is regulated through the overall design of the turbopump device, pipework, leak orifice, possibly with the addition of sonic regulating throats on the piping.

The turbine exhaust gases are thus used to form a cushion of gas that opposes the ability of the rocket engine combustion gases to leave between the fixed part and the moving part thereby avoiding losses in rocket engine efficiency and damage to the rear zone of the vehicle.

Furthermore, the turbine exhaust gases flow along the wall toward the divergent outlet and thus protect the moving parts from the heat of the jet of the rocket engine.

The flaps are, for example, moving flaps able to adopt various positions according to the phase of flight of the aircraft.

According to FIG. 4, the flaps 2 are positioned in the form of a conical divergent in the extension of and in continuity with the exit section of the fixed part of the rocket engine nozzle. The shape of the moving part, and notably the exit angle thereof, in this case is suited to being compatible with this continuity so as to encourage the expansion of the rocket engine jet.

This configuration offers a gain in engine performance and notably the openness of the cone may be variable, via the flap actuators, according to the increase in altitude during rocket propelled flight.

Figure 5:
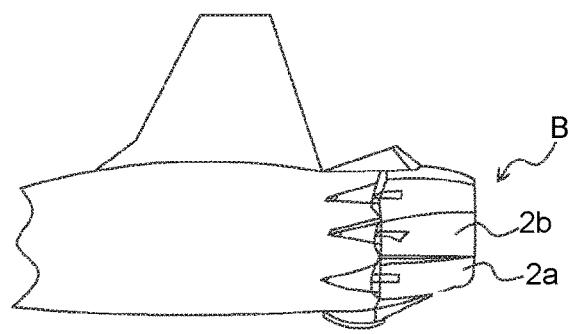
FIG. 5 is the rear of the aircraft of FIG. 4 with the flaps partially closing the nozzle of the rocket engine.

According to FIG. 5, the flaps are configured to form a cylinder (B) behind the fixed part of the nozzle, for example at the moment of rocket engine ignition, in order to improve combustion in the engine.

Figure 6:
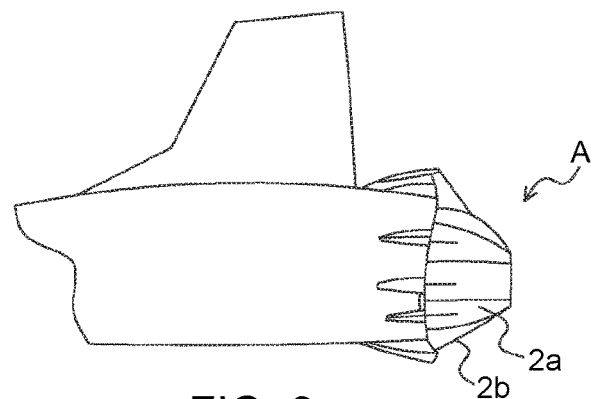
FIG. 6 is the rear of the aircraft of FIG. 4 with the flaps completely closing the nozzle of the rocket engine.

According to FIG. 6, the flaps are closed to adopt a cone shape (A) so as to provide an aerodynamic external shape which minimizes the drag of the base of the vehicle during atmospheric flight when the rocket engine is not lit, something which, in the case of a spaceplane, offers an improvement in the performance of the aircraft when propelled by its aerobic engine or engines, or when gliding.

In addition, the flap pivoting mechanism allows differential openings or closings which deflect the jet of the rocket engine and thus create an off-axis thrust component that allows the vehicle to be steered about the axes of pitch and yaw.

The disclosed embodiment is not limited to the examples depicted and in particular the number of flaps depicted in the Figures is nonlimiting.

What is claimed is:

1. A nozzle for ejecting combustion gas from a rocket engine comprising:
   a fixed part;
   a moving part extending the fixed part, said moving part produced in the form of flaps positioned downstream of the fixed part and forming an extension of the nozzle, wherein the nozzle further comprises:
   a flexible membrane providing sealing between the fixed part and the moving part, the flexible membrane being resistant to a local temperature of the combustion gas leaving the nozzle, the flexible membrane connecting a downstream end of the fixed part to a border of the flaps that form the moving part, the flexible membrane forms an annular pipe provided with a duct for conveying an exhaust gas from a turbine of a turbopump to the flexible membrane, the exhaust gas being injected between the fixed part and the moving part extending said nozzle.

2. The nozzle as claimed in claim 1, wherein the annular pipe is configured to distribute the exhaust gas over a perimeter of an outlet section of the fixed part of the nozzle.

3. The nozzle as claimed in claim 1, wherein the annular pipe is situated in line with a rocker arm of the moving part.

4. The nozzle as claimed in claim 1, wherein the flexible membrane is silica-based fabric able to withstand continuously a temperature of at least 1000° C. (1832° F.).

5. The nozzle as claimed in claim 1, wherein the flexible membrane comprises a ceramic insulator between two fabrics, one of one of the two fabrics comprising a fabric made from an aluminoborosilicate refractory ceramic fiber on a hot face side of the flexible membrane, the other one of the two fabrics comprising an aramid fiber type such as polyparaphenylene terephthalamide on a cold face side of the flexible membrane, the aramid fiber type fabric being intended to give the flexible membrane mechanical integrity.

6. A rocket engine comprising the nozzle with the fixed part, the moving part and flexible membrane as claimed in claim 1, wherein the flaps are arranged around an exit section of the rocket engine nozzle as an extension of the fixed part.

7. The rocket engine as claimed in claim 6, wherein the flexible membrane forming the annular pipe for injecting the exhaust gas from the turbine of the turbopump of the rocket engine between the fixed part of the nozzle and the moving part extending said nozzle, a pressure of the exhaust gas being regulated so as to be higher than a pressure of the combustion gas leaving the fixed part of the nozzle.

8. An aircraft comprising a rocket engine as claimed in claim 6, wherein the flaps are articulated on a frame of the aircraft.

9. The aircraft as claimed in claim 8, wherein the frame forms part of a rear fuselage in which the rocket engine is installed.

10. The aircraft as claimed in claim 8, wherein the flaps are able to move and able to allow the moving part to adopt at least one of:

a closed cone shape, so as to provide an aerodynamic external shape that minimizes drag of an aft end of the aircraft during atmospheric flight with the rocket engine not lit;

a cylinder shape at the moment of ignition of the rocket engine; and a conical divergent shape in the extension and continuation of the exit section of the rocket engine nozzle so as to encourage expansion of the rocket engine combustion gas.

11. The aircraft as claimed in claim 10, wherein the openness of the conical divergent shape can be varied according to an increase in altitude during rocket engine propelled flight.

12. The aircraft as claimed in claim 10, further comprising at least one link rod for pivoting the flaps which is able to allow differential openings or closings of said flaps which deflect a jet of the rocket engine combustion gas and thus create a lateral thrust component that allows the aircraft to be steered about a pitch axis and a yaw axis.

13. The aircraft as claimed in claim 8, wherein the flaps are arranged in two rows with internal/external surfaces of adjacent flaps overlapping one another and are suited to allowing a variation in the exit section of the nozzle while at the same time maintaining an overlap that minimizes leaks of combustion gas between the two rows.

* * * * *